United States Patent [19]

Sama

[11] 4,214,601

[45] * Jul. 29, 1980

[54] SIMULTANEOUS ACTUATION SAFETY VALVE

[76] Inventor: Nicholas Sama, 19120 Bel Aire Dr., Miami, Fla. 33157

[*] Notice: The portion of the term of this patent subsequent to Jan. 30, 1996, has been disclaimed.

[21] Appl. No.: 7,374

[22] Filed: Jan. 29, 1979

Related U.S. Application Data

[63] Continuation-in-part of Ser. No. 808,376, Jun. 20, 1977, Pat. No. 4,136,601.

[51] Int. Cl.² ............................................. F16K 17/00
[52] U.S. Cl. ..................................... 137/102; 137/111; 91/424
[58] Field of Search ....................... 137/102, 111, 114; 91/424, 425

[56] References Cited

U.S. PATENT DOCUMENTS

| | | | |
|---|---|---|---|
| 2,598,907 | 6/1952 | Griffin | 91/424 |
| 2,778,372 | 1/1957 | Jaquith | 137/111 |
| 3,273,582 | 9/1966 | Valentine | 137/111 |
| 3,848,848 | 11/1974 | Ditirro | 19/424 |

Primary Examiner—William R. Cline
Attorney, Agent, or Firm—Robert J. Van Der Wall

[57] ABSTRACT

A single small safety valve is furnished for use with hazardous machinery that requires simultaneous actuation and continuous pressure on two hand valves at points out of the danger zone of such machinery. Operating characteristics are achieved by a housing having an axial bore, a piston moving within that axial bore, input ports, output ports and an exhaust port located at suitable positions on the housing. The arrangement of these ports is such that open fluid communication can exist between the two input and output ports only if the input ports are pressurized within a small time interval necessary to retain the piston in a neutral position in the axial bore, and if said inputs are held to maintain pressurization during the time that it is desired to maintain pressure in the output ports. Operation of the hazardous machinery is contingent upon continuous pressurization at the output ports. If either input port ceases to be pressurized at any time, then the piston shifts, resulting in the output of the device becoming connected to the exhaust port, which disables the hazardous machinery.

5 Claims, 5 Drawing Figures

SIMULTANEOUS ACTUATION SAFETY VALVE

CROSS REFERENCE

This is a continuation-in-part of my earlier filed copending application, Ser. No. 808,376, filed June 20, 1977 now U.S. Pat. No. 4,136,601.

FIELD OF THE INVENTION

This invention relates to fluid power safety devices generally used to prevent actuation of a hazardous machine unless the operator thereof actuates two hand valves or switches in simultaneous, or near simultaneous, fashion. Such devices are often known as "no tie down" devices or circuits.

BACKGROUND OF THE INVENTION

A conventional manner of achieving "no tie down" characteristics has been to arrange a system of valves controlled by a pulse valve. This system or circuit insures a pressurized output can be obtained only if two hand valves are actuated within a pre-determined small time interval, and held continuously during the hazardous operation. This procedure has obvious beneficial application in controlling hazardous machinery, since proper mounting of the hand valves can make it impossible for the operator thereof to have either of his hands in dangerous areas during actuation of the machinery. Apart from the desirability of this type of safety device, it is now legally required that any hazardous industrial machinery in the United States be equipped with such a safety system.

However, there are certain problems with prior art types of "no tie down" systems. Many of them are extremely complex resulting in high cost and increased probability of failure. Moreover, some of them are vulnerable to circumvention by operators opposed to their use.

SUMMARY OF THE INVENTION

With the foregoing in mind, it is a principal object of the present invention to provide a simultaneous actuation safety device utilizing a small, greatly simplified mechanism.

Another object of the invention is to provide a "no tie down" device of low cost, high reliability, and long life.

Another object of the invention is to provide such a device which, by its size and integral construction will be extremely difficult to circumvent.

One more object of the invention is to provide such a safety device powered entirely by and producing its output in the same form, i.e., fluid pressure.

Other objects and advantages will become apparent to those skilled in the art upon reading the following descriptions of the invention and upon reference to the drawings.

In accordance with the invention, there is provided "no tie down" features via a novel and much simpler approach than is provided by the prior art devices. The necessary operating characteristics are achieved by a single valve comprising a housing having an axial bore, a piston moving within that axial bore, input ports and output ports and exhaust port, located at suitable positions on the housing. The arrangement of these ports is such that open fluid communication can exist between the two input and the output ports only if both input ports are pressurized within a small time interval necessary to retain the piston in a neutral position in the axial bore, and if said inputs are held to maintain pressurization during the time that it is desired to maintain pressure in the output port. Operation of the machine is, of course, contingent upon continuous pressurization of the output port. If either input port ceases to be pressurized at any time, then the piston shifts, resulting in the output of the device becoming connected to the exhaust port.

Two embodiments are disclosed and claimed with the preferred embodiment containing two diaphragms and with virtually no surface to surface sliding friction being present to cause wear within the invention.

Invention will be better understood after reading the following detailed descriptions of the embodiments thereof with reference to the appended drawings, in which:

DETAILED DESCRIPTION

Figure 1:
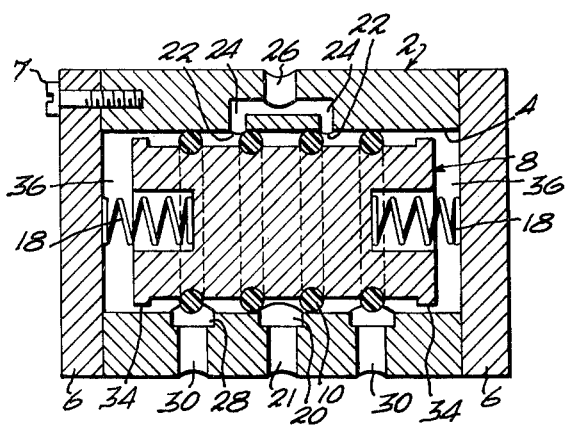
FIG. 1 shows a cross section of the device taken through the axis of the bore in the housing, and showing the piston in a neutral position.

Referring first to FIG. 1, a housing 2, preferably in the form of a cylinder, contains an axial bore 4, which may be sealed by at least one end cap 6 utilizing connecting means 7. Contained in the axial bore 4 is a piston 8 in coaxially movable internal relationship with and of lesser axial length than the housing bore 4. This lesser axial length defines piston travel within areas 36. For the sake of convenience in description only, and not by way of limitation of the invention, piston travel will be defined as either left or right based on the configuration shown in FIGS. 1 and 2.

The piston contains four similar circumferential grooves which capture four circumferential sealing means 10, which are preferably O rings. The O rings provide a seal at four different positions along the piston with the housing bore 4, but allow movement of the piston left and right. Again, by way of convenience in description and not as a limitation of the invention, these sealing means beginning at the left side of the piston as shown in FIG. 1 denominating respectively a first sealing means, a second sealing means, a third sealing means, and a fourth sealing means near the right end of the piston.

In contact with the piston is included resilient urging means 18 to urge the piston to a neutral position in the housing bore. The housing is also penetrated by left and right input ports 30 intended for connection to external means for applying fluid pressure thereto. Said input ports 30 are connected to input internal openings 28 which are of a suffient width to straddle sealing means 10. These internal openings are also located such that they straddle the first and fourth sealing means when the piston is in a neutral position, thereby allowing fluid pressure into the area of both piston ends 36 as well as between the first and second sealing means and the third and fourth sealing means. An output port 26 is connected by conduits 24 to left and right output internal openings 22. The left output opening 22 intersects the bore 4 entirely between the first and second sealing means when the piston is in the neutral position, thereby deriving pressure from input port 30 in that configuration. Similarly, the right output opening intersects the bore 4 between the third and fourth sealing means when the piston is in the neutral position, thereby obtaining pressure from the right input port 30. In this configuration, it can be seen the pressure is supplied from the two balanced input ports 30 to the output port 26.

The housing is also penetrated by an exhaust port 21 having an internal opening 20 positioned entirely between the second and third sealing means when the piston is in the neutral position. Exhaust port 21 is therefore isolated from all other ports when the piston is in the neutral position.

Figure 2:
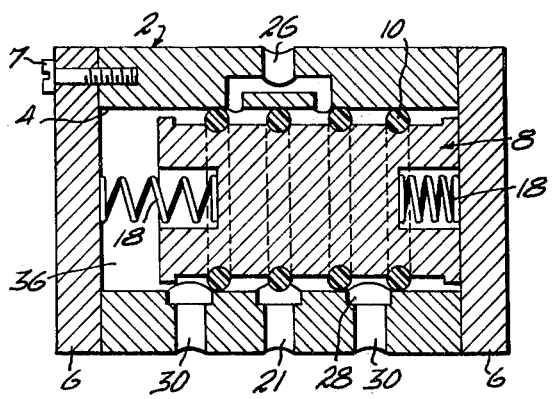
FIG. 2 is a similar cross-sectional view to FIG. 1, but illustrating the position of the piston upon pressurization of the left input port only.

If, however, the pressure at any time between the two input ports becomes unbalanced, the piston will shift as illustrated in FIG. 2 to the left or the right. This occurs because some pressurization is lost in one of the areas 36 while being retained in the other. In FIG. 2, it is assumed that the pressure on the left input port has exceeded the pressure on the right input port resulting in travel to the right of the piston 8. It will be seen by the position of the various sealing means that the output port now has access to the exhaust port resulting in a loss of pressure to the atmosphere, and that pressure from neither the left nor right input ports can reach the output port. As long as pressure is retained in left input port, the piston will remain displaced toward its right end as illustrated in FIG. 2 preventing pressurization of the output port. Upon release of the pressure from the left input port, the piston may return to the neutral position illustrated in FIG. 1 through the resilient urging means, at which time both input ports 30 must be simultaneously, or near simultaneously, pressurized in order to again produce an output port pressurization.

FIG. 1 also illustrates that flow rate in movement of the piston may be influenced by the alternative of adding circumferential bosses 34 on both ends of the piston which will approach but not contact the housing bore. These will act to restrict fluid flow about the end of the piston 8 into areas 36.

Figure 3:
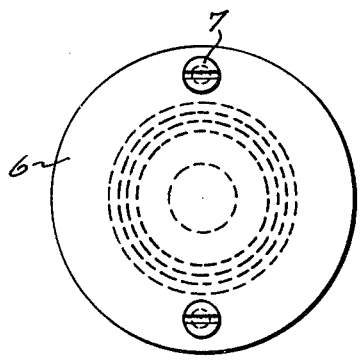
FIG. 3 is an end view of the embodiment illustrated in FIGS. 1 and 2.

FIG. 3 merely illustrates that the housing will preferably be in the form of a cylinder with concentric bore, piston, and other components.

Figure 4:
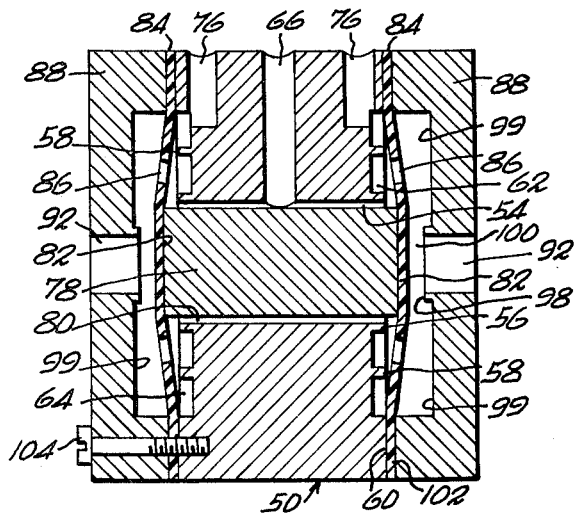
FIG. 4 shows the preferred embodiment of the invention in cross-sectional view taken through the axis of the bore in the housing, and showing the piston in a neutral position.

Turning to FIG. 4, there is illustrated the preferred embodiment of the invention utilizing diaphragms and a different porting arrangement than that shown in FIGS. 1 and 2.

A housing 50, which is preferably in the form of a cylinder contains an axial bore 54 and ends of the housing 60 which form diaphragm mounting surfaces at 102 and seating facets at 56 and 58. The invention also includes end caps 88 which may be connected by a bolt or other means 104 and containing therein a cavity formed from internal surfaces 99. Sealingly sandwiched between the housing 50 and end caps 88 are two diaphragms 84, containing at least one orifice each at 86. The orifice must be in proximity to seating facets 56 and 58. A piston 78 is in movable internal concentric relationship with and of lesser diameter than the axial bore 54. The difference in diameter defines a fluid flow space 80, and the piston 78 is suspended within the axial bore 54 by attachment to the elastomeric diaphragm 84 at 82.

The piston 78 is of greater axial length than the housing 50 resulting in outward deflection of the diaphragms 84 when the piston 78 is in the neutral position. However, the length of the piston 78 combined with the thicknesses of both diaphragms 84 at 82 is less than the axial distance between the cavity 100 defining internal surfaces 99 and inlet seats 98, said axial distance thereby defining the limit of axial piston travel.

The end caps each contain an inlet port 92 which is of lesser diameter than that of the piston 78. In proximity to the inlet port 92 are inlet seats 98.

Figure 5:
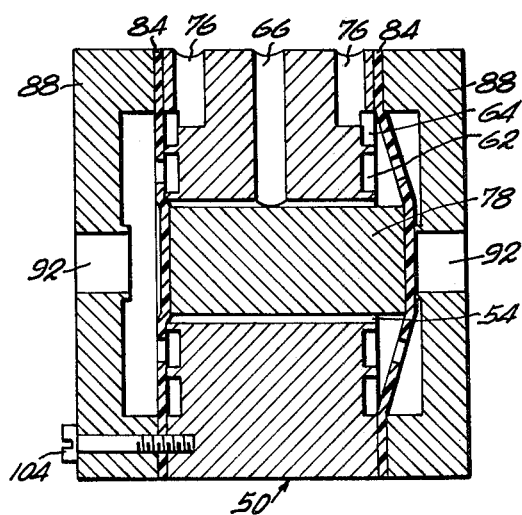
FIG. 5 is a similar cross-sectional view to that of FIG. 4, but showing the piston position upon pressurization of only one input port.

Turning to FIG. 5 for a moment, it can be seen that a seal is created between the diaphragm 84 at 82 with inlet seat 98 when the piston 78 is deflected to either of the inlet ports.

Returning to FIG. 4, the housing 50 is penetrated by an output port 66 suitable for connection to machinery or other apparatus that the invention is intended to guard and control. At least one exhaust port 76 penetrates the housing and intersects the seating facet 58 near the sandwich formed by the housing, diaphragm, and end cap. When slight pressure is exerted on diaphragms 84, from within the cavity 100 in each end cap 88, the diaphragms will be slightly deflected to and seat against the seating facets 58 on both sides of the invention when the piston 78 is in the neutral position. This will result in little or no leakage of fluid through one or more exhaust ports 76.

However, because the diaphragms 84 are deformed outwardly as a result of the greater axial length of the piston 78 than the axial length of the housing 50, there is no seal formed between the diaphragms 84 and the output seat 56 when the piston 78 is in the neutral position. Fluid pressure can then be applied from inlet port 92 into cavities 100, through orifice 86 in diaphragms 84 into fluid flow space 80 and output port 66.

On the other hand, if pressure does not remain equal at all operative times from the two inlet ports 92, piston 78 will shift to one side or the other. The effect of this is not only to seal the inlet port on the side to which the piston shifts as described above, but also on the same side to open fluid communication among output port 66, fluid flow space 80, past output seating facet 56 and exhaust facet 58, and to exhaust ports 76. Thus pressure pre-existing in output port 66 will be vented to the atmosphere via the foregoing route through exhaust port 76.

At the same time, substantially planar sealing contact will be established between the diaphragm on the high pressure side and the seating facets 56 and 58, preventing fluid communication between high pressure input 92 and output port 66. Moreover, high pressure cavity 100 would be pressurized with no escape so as to maintain the axial displacement of the piston 78.

The diaphragms 84 are, of course, resilient and preferably made of an elastomeric material. Said diaphragms 84 will tend to urge the piston 78 into the neutral position when not opposed by unequal pressures in cavities 100.

The housing may optionally contain an output recess 62 which will be in immediate proximity to the orifice 86 in diaphragms 84. Similarly, the exhaust port 76 may intersect seating facet 58 through an exhaust recess 64.

Having described the presently preferred embodiments of the invention, it should be understood that various changes in construction and arrangement will be apparent to those skilled in the art, and are fully contemplated here without departing from the true spirit of the invention. Accordingly, there are covered all alternatives, modifications, and equivalents as may be included within the spirit and scope of the invention as defined solely by the appended claims.

What is claimed is:

1. A fluid power device comprising:
   a housing having an axial bore;
   at least one end cap sealing the housing bore;
   a piston having a left end and a right end in coaxially movable internal relationship with and of lesser axial length than the housing bore, said lesser axial length defining piston travel, left and right, with the piston containing four circumferential grooves;
   four circumferential sealing means captured by the grooves and in movable sealing relationship with the housing bore, said sealing means denominating respectively a first sealing means, proximal the left piston end, a second sealing means, a third sealing means and a fourth sealing means, proximal the right piston end;
   resilient urging means to urge said piston to a neutral position in the housing bore;
   left and right input ports penetrating the housing, said input ports having input internal openings intersecting the bore which respectively straddle the first and fourth sealing means when the piston is in the neutral position, wherein the left input port will be separated from the right end of the piston by the first sealing means when the piston travels right, and the right input port will be separated from the left end of the piston by the fourth sealing means when the piston travels left;
   an exhaust port penetrating the housing with exhaust internal opening intersecting the bore entirely between the second and third sealing means when the piston is in the neutral position; and
   an output port penetrating the housing connected to both left and right output internal openings, said left output opening intersecting the bore entirely between the first and second sealing means when the piston is in the neutral position, but being separated from the left input port by the first sealing means when the piston travels right, said right output opening intersecting the bore entirely between the third and fourth sealing means when the piston is in the neutral position, but being separated from the right input port by the fourth sealing means when the piston travels left, at least one of said output openings not being separated by any of the sealing means from the exhaust port when the piston travels either left or right.

2. The fluid power device of claim 1 which further comprises:
   circumferential bosses on both ends of the piston which approach but do not contact the housing bore.

3. A fluid power device comprising:
   a housing having an axial bore and two ends which form both diaphragm mounting surfaces and two seating facets on each end;
   two end caps, each having a cavity defined by internal surfaces thereof, and diaphragm mounting surfaces which correspond to the diaphragm mounting surfaces of the housing;
   two elastomeric diaphragms, each sealingly sandwiched between a diaphragm mounting surface of an end cap and a diaphragm mounting surface of the housing, each diaphragm containing at least one orifice therethrough between the seating facets of the adjacent housing end;
   a piston in coaxially movable internal relationship with the housing bore and defining therebetween a fluid flow space, said piston being movably suspended substantially concentric with the axis of the housing bore by contact of both ends of the piston with the diaphragms which are both deformed outwardly into the cavity within each end cap when the piston is in a neutral position, said deformation being as a result of the piston being of greater axial length than the housing, with the least axial distance between the cavity defining internal surfaces of the end caps being greater than that of the piston combined with two thicknesses of diaphragm with which the piston is in contact, said axial distance thereby defining the limits of axial piston travel;
   an inlet port penetrating each end cap;
   an inlet seat on each end cap surrounding each inlet port, of smaller area than an area of the opposite end of the piston, said inlet seat located to form a seal with the diaphragm when said diaphragm comes in contact with the seat as a result of axial piston movement toward that inlet seat, which axial movement also results in substantially sealing contact of the other diaphragm with both of the adjacent seating facets of the housing end;
   an output port penetrating the housing and intersecting the bore and fluid flow space; and
   at least one exhaust port penetrating the housing and intersecting a seating facet at each end of the housing in a location with regard to the housing, diaphragm, end cap sandwich to minimize fluid communication between the diaphragm orifice and the exhaust port as a result of slight diaphragm deformation with the piston is in a neutral position, said seating facet forming a seal with the adjacent diaphragm when said diaphragm comes into substantially sealing contact with the seating facet as a result of axial movement of the piston;
   said seal separating the adjacent diaphragm orifice both from the exhaust port and the fluid flow space which is in fluid communication with the output port, the other diaphragm not being in contact with its adjoining seating facet as a consequence of the axial movement of the piston, thereby permitting open fluid flow communication among the adjacent output port, fluid flow space and exhaust port.

4. The fluid power device of claim 3 which further comprises an exhaust recess in the ends of the housing, said exhaust recess in fluid communication with the exhaust port.

5. The fluid power device in claim 3 which further comprises an output recess in the ends of the housing in proximity to the orifice of the diaphragm.

* * * * *